United States Patent
Kamata et al.

(10) Patent No.: US 6,546,197 B2
(45) Date of Patent: Apr. 8, 2003

(54) METHOD AND APPARATUS OF CORRECTING IMAGE DATA PICKED UP FROM PHOTOGRAPHIC FILM

(75) Inventors: Kazuo Kamata, Kanagawa (JP); Kazumi Koike, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 2 days.

(21) Appl. No.: 09/803,924

(22) Filed: Mar. 13, 2001

(65) Prior Publication Data

US 2001/0031139 A1 Oct. 18, 2001

(30) Foreign Application Priority Data

Mar. 15, 2000 (JP) .......................... 2000-071739
Mar. 15, 2000 (JP) .......................... 2000-072671

(51) Int. Cl.[7] .................. G03B 27/68; G03B 17/02; G03B 33/00
(52) U.S. Cl. .................. 396/6; 396/311; 355/52; 355/77
(58) Field of Search .................. 396/6, 310, 311, 396/315, 319, 493, 496; 355/32, 35, 38, 52, 77; 358/302, 444, 448, 487, 506

(56) References Cited

U.S. PATENT DOCUMENTS

| | | |
|---|---|---|
| 5,461,440 A | 10/1995 | Toyoda et al. |
| 6,219,446 B1 * | 4/2001 | Kiriki et al. ............ 348/241 |
| 6,323,934 B1 * | 11/2001 | Enomoto ............ 355/32 |
| 6,339,466 B1 * | 1/2002 | Matama ............ 355/40 |

FOREIGN PATENT DOCUMENTS

| | | |
|---|---|---|
| DE | 199 13 311 | 9/1999 |
| JP | 06-236004 | 8/1994 |
| JP | 10-319517 | 12/1998 |
| WO | 93/04442 | 3/1993 |

* cited by examiner

Primary Examiner—Alan A. Mathews
(74) Attorney, Agent, or Firm—Young & Thompson

(57) ABSTRACT

There is disclosed a method and an apparatus of correcting image picked up from a frame photographed on a photo filmstrip through a photographic device. An exposure correction amount is calculated by use of correction parameters predetermined with regard to decrease in illuminance on a focal plane of the taking lens with radial distance from an optical axis of the taking lens, and a curvature of the photo filmstrip relative to the focal plane. The exposure correction amount is calculated for a respective pixel of the picture with regard to a relative position of the respective pixel in the frame to an optical axis of a taking lens of the photographic device. The relative positions are defined on the assumption that the photo filmstrip is held flat in a focal plane of the taking lens with a center point of the frame located on the optical axis at the photography.

14 Claims, 8 Drawing Sheets

FIG. 8A

| SAMPLING POINT | INITIAL OPENING ANGLE: θa | FULL OPENING ANGLE: θb | MEAN ANGLE: θc=(θa+θb)/2 | EXPOSURE ANGLE: θd=(θ0−θc)·2 | EXPOSURE TIME RATIO: Te | LENS ILLUMINANCE: Fα | IMAGE SURFACE ILLUMINANCE RATIO: α=Te·Fα | CORRECTION AMOUNT: Eα=log2(α) |
|---|---|---|---|---|---|---|---|---|
| SAMPLE 1 | 5.28° | 10.02° | 7.65° | 74.70° | 1.22 | 0.561 | 0.684 | −0.55 |
| SAMPLE 2 | 7.22° | 12.18° | 9.70° | 70.60° | 1.15 | 0.677 | 0.780 | −0.36 |
| SAMPLE 3 | 8.35° | 13.52° | 10.93° | 68.13° | 1.11 | 0.561 | 0.624 | −0.68 |
| SAMPLE 4 | 13.83° | 18.68° | 16.26° | 57.48° | 0.94 | 0.825 | 0.774 | −0.37 |
| SAMPLE 5 | 11.82° | 17.63° | 14.73° | 60.55° | 0.99 | 0.561 | 0.554 | −0.85 |
| SAMPLE 6 | 15.77° | 20.93° | 18.35° | 53.30° | 0.87 | 0.677 | 0.589 | −0.76 |
| SAMPLE 7 | 18.68° | 23.48° | 21.08° | 47.83° | 0.78 | 0.561 | 0.438 | −1.19 |
| SAMPLE 8 | 9.13° | 14.18° | 11.66° | 66.68° | 1.09 | 0.825 | 0.897 | −0.16 |
| SAMPLE 9 | 4.80° | 8.68° | 6.74° | 76.52° | 1.25 | 0.865 | 1.080 | 0.11 |
| SAMPLE 10 | 10.63° | 15.47° | 13.05° | 63.90° | 1.04 | 0.865 | 0.902 | −0.15 |
| SAMPLE 11 | 12.38° | 17.50° | 14.94° | 60.12° | 0.98 | 0.865 | 0.848 | −0.24 |
| SAMPLE 12 | 15.18° | 20.03° | 17.61° | 54.78° | 0.89 | 0.865 | 0.773 | −0.37 |
| SAMPLE 13 | 11.92° | 16.78° | 14.35° | 61.30° | 1.00 | 1.000 | 1.000 | 0.00 |

METHOD AND APPARATUS OF CORRECTING IMAGE DATA PICKED UP FROM PHOTOGRAPHIC FILM

BACKGROUND OF THE INVENTION

1. Field of the Invention

The present invention relates to a method of correcting image data picked up from frames photographed on photographic film, especially those photographed by lens-fitted photographic film units or compact cameras, for printing pictures with improved quality on the basis of the corrected image data.

2. Background Arts

As a photographic device for taking pictures on a photographic film, the lens-fitted photo film units have been known these days besides cameras, including single-reflection cameras and compact cameras. The lens-fitted photo film unit, hereinafter called the film unit, is widely used in the world because of its handiness: it contains a roll of unexposed photographic film in a unit body having photographic mechanisms, including a taking lens and a shutter mechanism, incorporated thereinto, to permit enjoying photography quickly on the spot as it is purchased, and the user has only to forward the film unit after photography to an agency of a photofinisher. Since another advantage of the film unit is that it is provided at a low price, the manufacturing cost should be as low as possible, so the structure must be simple, and the components must be inexpensive.

For this reason, the taking lens mounted to the above described film unit is usually composed of a single or a couple of plastic lenses. Were the taking lens is composed of a single or a couple lenses, it is difficult to correct aberrations to improve the image quality only by the performances of the taking lens. For this reason, in the conventional film unit, in order to compensate for curvature of field of the taking lens, one of the factors in deterioration of the image quality, the photographic film is held to curve its surface along its lengthwise direction with the center of curvature located on the object side, i.e. on the side of the taking lens, such that an optical image formed through the taking lens on the curved film surface is in focus in the entire area of an exposure frame that is exposed through an exposure aperture of the film unit.

However, this configuration is ineffective to correct other aberrations, such as chromatic aberration and distortion, and other factors that lower the quality of photographed images. As one of the factors adversely affecting the image quality, it is well-known in the art that image surface illuminance of a taking lens decreases with radial distance from the optical axis of the taking lens. As a result, even where the photographic light entering the taking lens has an uniform brightness, exposure amount is lowered in marginal portions of the exposure frame as compared to a center point of the exposure frame, that is located on the optical axis of the taking lens. Such decrease in illuminance with the radial distance from the center point of the exposure frame cannot be compensated for just by curving the film surface along the lengthwise direction behind the taking lens.

Furthermore, to simplify the structure, the film unit uses a simple shutter mechanism, called kickoff type, that uses a shutter blade swinging in front of a shutter aperture to open and then close the shutter aperture. As shown schematically in FIG. 9, the shutter blade 70 starts swinging from a closing position for closing the shutter aperture 77, when it is kicked by a shutter drive lever. While gradually opening the shutter aperture 71, the shutter blade 70 swings in an opening direction to a maximum opening position as shown by phantom lines. After reaching the maximum opening position, the shutter blade 70 starts swinging in a closing direction according to an urging force of a returning spring 72, while gradually closing the shutter aperture 71, till it returns to the closing position.

In the film unit, the shutter blade is ordinarily located behind a stop aperture at a certain distance from the stop aperture. According to this configuration, rays passing through the taking lens are projected from the stop aperture toward the exposure frame of the filmstrip in the form of a plurality of bundles whose positions are shifted from each other on a plane in which the shutter blade 70 swings, as shown for instance by bundles 73a, 73b, 73c, 73d and 73e in FIG. 9.

Because of the displacement between the bundles 73a to 73e on the swinging plane of the shutter blade 70, in the example shown in FIG. 9, the upper-right bundle 73a first starts entering the shutter aperture 71 and the lower-left bundle 73d last starts entering the shutter aperture 71, as the shutter blade 70 swings in the opening direction. On the contrary, as the shutter blade 70 swings in the closing direction, the lower-left bundle 73d is first blocked from the shutter aperture 71, and the upper-right bundle 73a is last blocked from the shutter aperture 71. As a result, the upper-right portion of the exposure frame is exposed for the longest time, whereas the lower-left portion of the exposure frame is exposed for the shortest time in this example. Consequently, with the kickoff type shutter mechanism, there are differences in exposure time between different positions within the exposure frame.

Indeed it is possible to adopt another type of shutter mechanism that prevents the unevenness of exposure caused by the different exposure time, but such a shutter mechanism is expensive and requires a larger space, so it would increase the cost and size of the film unit. Therefore, this solution is hardly practical.

Meanwhile, digital printing has recently been popular in the world, where pictures are printed on the basis of digital image data picked up through a solid-state imaging device, like CCD. It has also been known in the art to pick up image data from pictures photographed on photographic film, and make photo-prints of the pictures on the basis of the image data. By correcting the image data appropriately before printing, it is possible to obtain good-quality pictures even while the original pictures are photographed by use of a simple and cheap photographic device, such as the film units or compact cameras.

SUMMARY OF THE INVENTION

In view of the foregoing, an object of the present invention is to provide a method of correcting image data picked up from pictures photographed on photographic film that is held curved behind the taking lens, so as to compensate for the decrease in illuminance with the radial distance from the center of the exposure frame while taking account of the curvature of the film.

Another object of the present invention is to provide a method of correcting image data picked up from pictures photographed on photographic film by use of a shutter mechanism, so as to compensate for the positional unevenness in exposure time that is caused by the open-close movement of the shutter blade.

According to an aspect of the present invention, a method of correcting image picked up from a frame photographed on a photo filmstrip through a photographic device, comprises the steps of:

calculating an exposure correction amount for a respective pixel of the picture on the basis of correction parameters predetermined with regard to those factors involved in the photographic device which cause unevenness of exposure in the frame, and a relative position of the respective pixel in the frame to an optical axis of a taking lens of the photographic device, assuming that the photo filmstrip is held flat in a focal plane of the taking lens with a center point of the frame located on the optical axis at the photography; and correcting the image data of each pixel in accordance with the exposure correction amount.

According to another aspect of the present invention, a method of correcting image data picked up from a frame photographed on a photo filmstrip through a taking lens, wherein the photo filmstrip is held concave on the side of the taking lens with a center point of the frame located on an optical axis of the taking lens in a focal plane of the taking lens when the frame is photographed, the method comprising the steps of:

determining a first kind of correction amount for each pixel of the picture, to compensate for decrease in exposure amount that results from decrease in illuminance in a focal plane of the taking lens with radial distance from an optical axis of the taking lens, provided that the photo filmstrip is held flat in the focal plane when the frame is photographed:

determining a second kind of correction amount for each pixel of the picture on the basis of increase in illuminance in those portions of the frame which are shifted from the focal plane toward the taking lens as a result of the curvature of the photo filmstrip behind the taking lens; and correcting image data of each pixel in accordance with an exposure correction amount obtained from the first and second kinds of correction amounts.

According to a preferred embodiment, the first and second kinds of correction amounts are calculated according to the following equations:

$$E1 = A \cdot L^2 + B \cdot L^4,$$

wherein $L = \sqrt{(x^2 + y^2)}$ $$E2 = C \cdot x^2 + D \cdot x^4$$

wherein E1 and E2 represent the first and second kinds of correction amounts for a pixel picked up from an appropriate point in the frame, L represents a radial distance of the appropriate point from the center point of the frame, "x" and "y" respectively represent coordinates values of the appropriate point in orthogonal X-Y coordinates whose plane corresponds to the focal plane, whose X-axis corresponds to the curved direction of the photo filmstrip, and whose Y-axis crosses the X-axis at the center point of the frame, provided that the photo filmstrip is held flat in the focal plane, and A to D represent correction coefficients.

According to a further aspect of the invention, a method of correcting image data picked up from a frame photographed on a photo filmstrip through a taking lens while a shutter mechanism opens a shutter opening, the method comprising the steps of:

calculating an exposure correction amount for a respective pixel of the picture on the basis of correction parameters predetermined in accordance with factors of the shutter mechanism that cause positional unevenness in exposure time within the frame of the photo filmstrip; and correcting image data in accordance with the exposure correction amount for each pixel.

Where the shutter mechanism comprises a shutter blade that swings about a rotary axis in a perpendicular plane to an optical axis of the taking lens in an opening direction to open the shutter aperture till the shutter blade reaches a maximum opening position past a full opening position where the shutter aperture is fully opened, and thereafter in a closing direction to close the shutter aperture, the exposure correction amount is calculated according to the following equation, assuming that the photo filmstrip is held flat in a focal plane of the taking lens with a center point of the frame located on the optical axis when the frame is photographed:

$$E3 = K \cdot \log_2(M \cdot \{\tan^{-1}((P-x)/(Q-y))\} + S) + G$$

wherein

E3 represents the exposure correction amount for a pixel picked up from an appropriate point in the frame;

"x" and "y" represent coordinate values of the appropriate point in orthogonal X-Y coordinates whose plane corresponds to the focal plane of the taking lens and whose axes cross at the optical axis of the taking lens; and P, Q, S, M, K and G represent the correction parameters.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein:

FIG. 8A is a Table showing theoretic values of correction amounts for predetermined sampling points in the exposure frame and respective values for use in calculating these theoretic values according to the second embodiment;

DETAILED DESCRIPTION OF THE EMBODIMENTS

Figure 1:
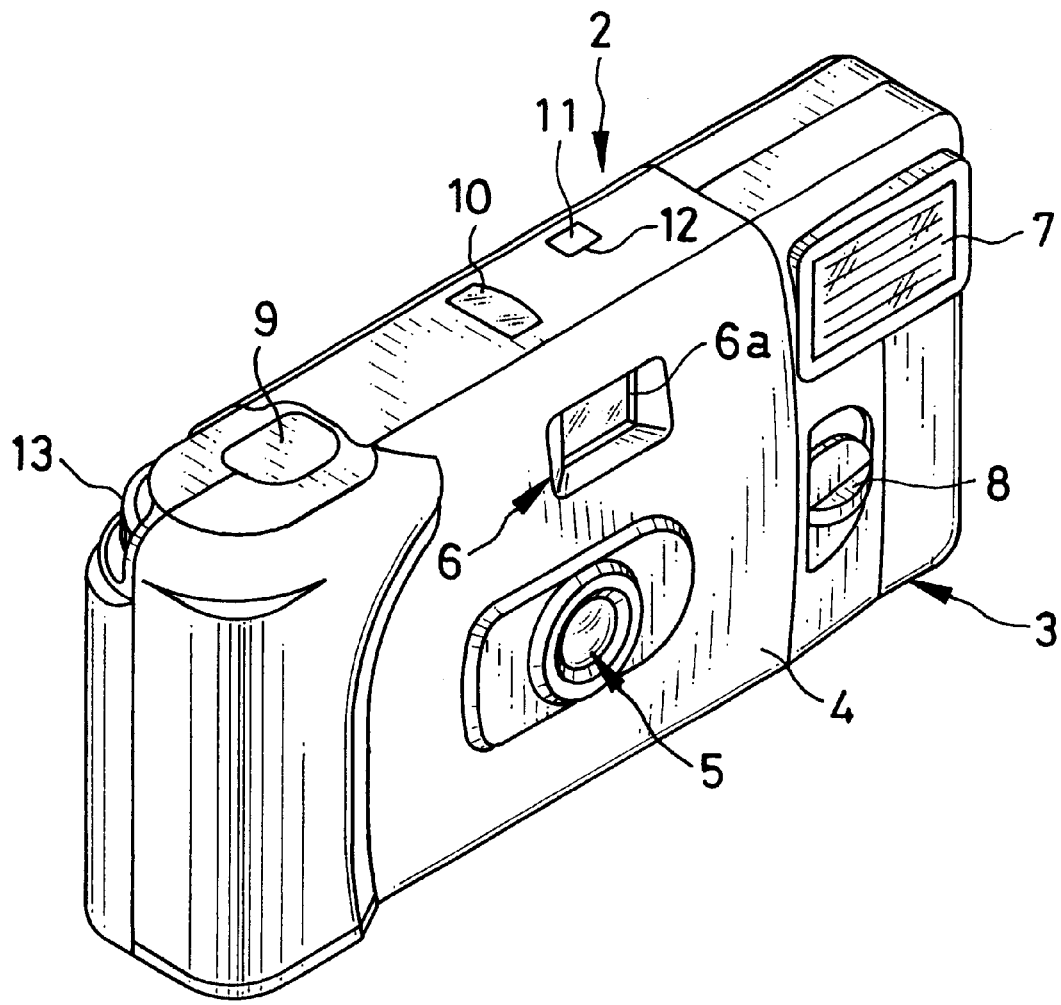
FIG. 1 is a perspective view of an example of a film unit in which a photo filmstrip is curved forwardly concave behind a taking lens.

As shown for example in FIG. 1, a film unit 2 consists of a unit body 3 having various photographic mechanism incorporated thereinto, and a label 4 that is put around the unit body 3.

On the front side of the unit body 3 are provided a taking lens 5, an objective window 6a of a viewfinder 6, a flash projector 7, a flash operation member 8 for turning a flash unit ON and OFF. On the top side are provided a shutter button 9, a counter window 10 for indicating the remaining number of available exposures, and an opening 12 through which a light guide 11 may protrude out as an indicator for indicating the completion of charging the flash unit. On the back side of the unit body 3, a winding wheel 13 is exposed outside, for being turned after each photography.

Figure 2:
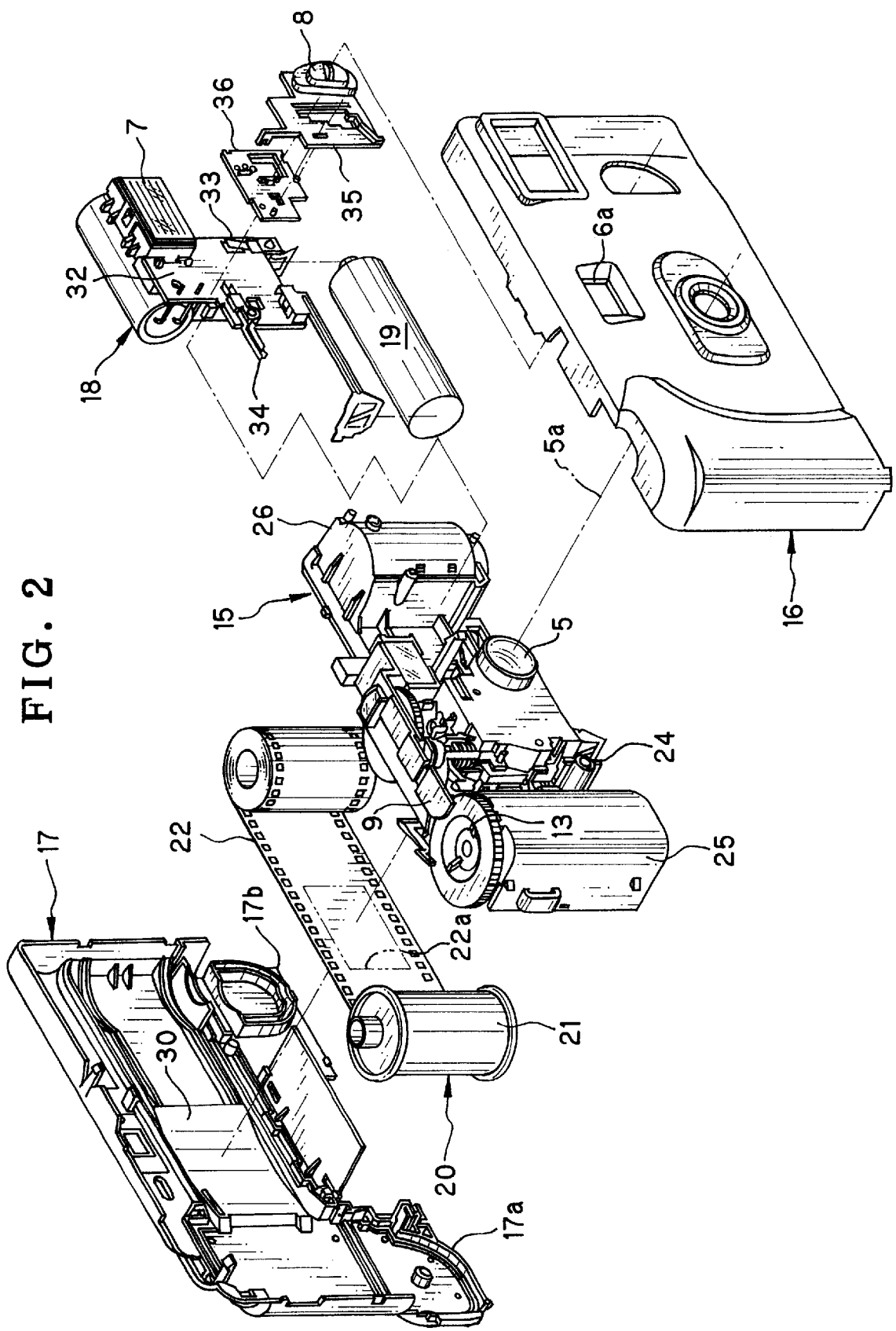
FIG. 2 is an exploded perspective view of a unit body of the film unit of FIG. 1.

As shown in FIG. 2, the unit body 3 is mainly constituted of a body basic portion 15, a front cover, a rear cover 17, a flash unit 18, and a battery 19. An unexposed photo film cartridge 20 is loaded in the unit body 3 on manufacturing the film unit 2. In the shown embodiment, the photo film cartridge 20 is of a 135-type, and consists of a cartridge shell 21 and a negative photo filmstrip 22.

A light-shielding chamber 24 is formed integrally with the body basic portion 15 on its front middle portion, for shielding a photographic light path from the taking lens 5 to the photo filmstrip 22 from extraneous light. A cartridge chamber 25 and a film chamber 26 are formed integrally on opposite horizontal sides of the light-shielding chamber 24, for holding the cartridge shell 21 and the photo filmstrip 22 as coiled into a roll, respectively.

Figure 3:
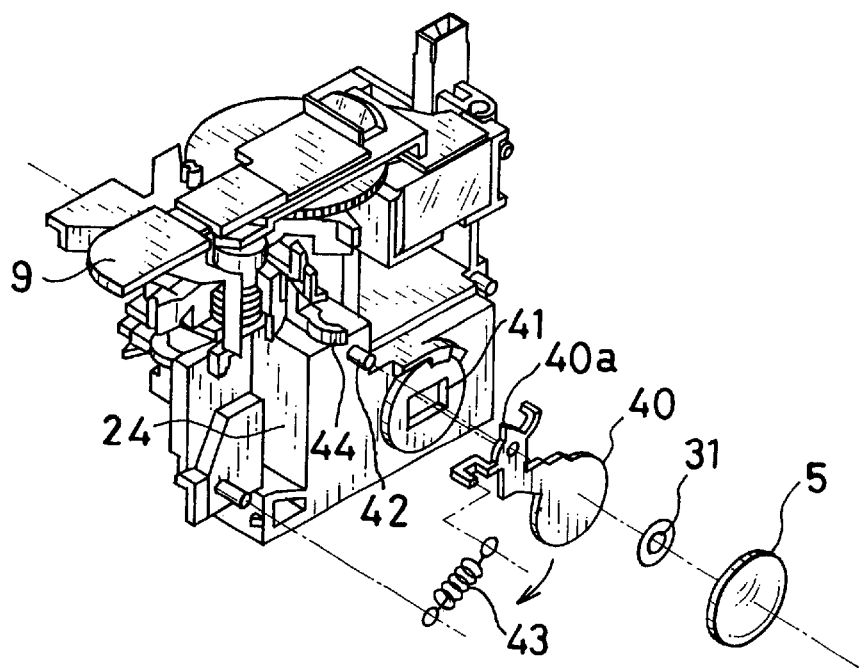
FIG. 3 is an exploded perspective view of a shutter mechanism of the film unit.

Outside the light-shielding chamber 24 are mounted members of a shutter mechanism, a frame counter mechanism and other photographic mechanisms as well as the taking lens 5. As shown in detail in FIG. 3, the shutter mechanism drives a shutter blade 40 to open and close a shutter opening 41 that is formed through a front wall of the light-shielding chamber 24 behind the taking lens 5. The shutter blade 40 is pivoted on an axle 42, and is urged by a spring 43 to stay in a closing position for closing the shutter opening 41. Pressing the shutter button 9 causes a shutter drive lever 44 to kick an upper end 40a of the shutter blade 40, thereby causing the shutter blade 40 to swing in an opening direction, as shown by an arrow in FIG. 3, against the force of the spring 43. The shutter blade 40 swings further in the opening direction after opening up the shutter aperture 41 till it reaches a maximum opening position, and thereafter starts swinging in a closing direction according to the force of the spring 43, to return to the closing position.

Figure 4:
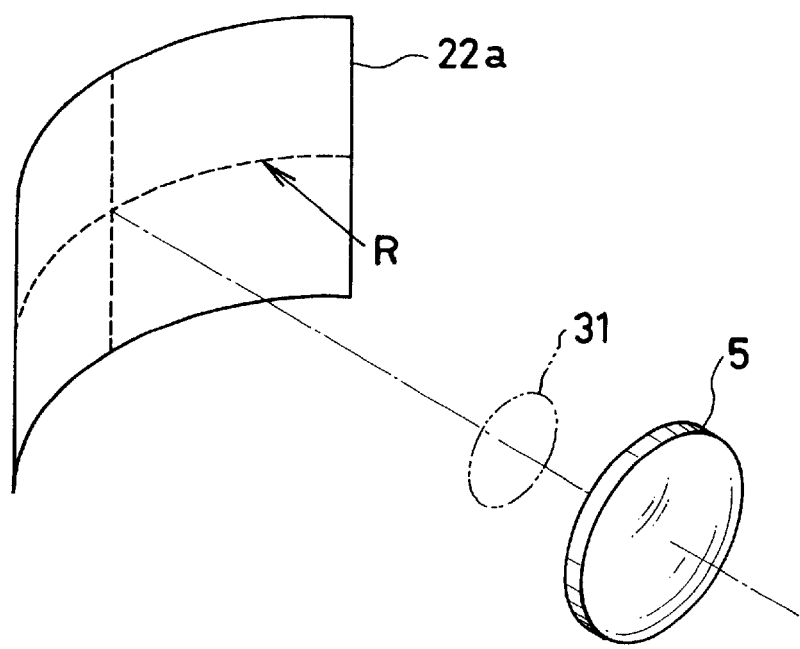
FIG. 4 is an explanatory diagram illustrating a positional relationship between the taking lens, a stop aperture and an exposure frame of the photo filmstrip.

While the shutter opening 41 is open, an optical image of a subject is projected through the taking lens 5, a stop aperture 31 and the shutter opening 41 onto the photo filmstrip 22. A not-shown exposure aperture is formed in the rear side of the light-shielding chamber 24, to define an exposure frame 22a of the photo filmstrip 22, i.e., an area exposed to the optical image, or the size of a picture frame on the photo filmstrip 22. Since the photo film cartridge 20 is of ISO 135-type in this embodiment, the exposure aperture and thus an exposure frame 22a are sized about 24×36 mm, of which longer sides extend in the lengthwise direction of the photo filmstrip 22. As shown in FIG. 4, the center of the exposure aperture and thus the center of the exposure frame 22a are located on an optical axis 5a of the taking lens 5.

The winding wheel 13 is rotatably mounted on the top side of the cartridge chamber 25. The winding wheel 13 is turned to wind up the exposure frame 22a after exposed into the cartridge shell 21, and place a next unexposed exposure frame 22a behind the exposure frame.

The rear cover 17 is attached to the body basic portion 15 to cover the rear and bottom sides of the body basic portion 15, after the cartridge shell 21 and the rolled photo filmstrip 22 are loaded in the cartridge chamber 25 and the film chamber 26. The rear cover 17 is integrally formed with bottom lids 17a and 17b for closing bottom sides of the cartridge chamber 25 and the film chamber 26 in a light-tight fashion. The rear cover 17 has a film backing surface 30 in a section facing the exposure aperture of the body basic portion 15. A gap between the film supporting surface 30 and the body basic portion 15 makes a film advancing path from the cartridge chamber 25 to the film chamber 26.

The film supporting surface 30 is curved to be concave on the object side along the film advancing direction. Guide rails are provided above and below the exposure aperture, which are curved to be convex on the image side along the film advancing direction complementary to the film supporting surface 30. According to the curved film backing surface 30 and the curved guide rails, the exposure frame 22a as being placed behind the exposure aperture is held curved along its lengthwise direction with the center of curvature located on the object side, i.e. on the side of the taking lens 5, at a radius of curvature R. Thereby, blurs of the optical image formed in the exposure frame 22a, that are caused by the curvature of field of the taking lens 5, are reduced.

The flash unit 18 is constituted of a printed circuit board 32 having components of a flash circuit mounted thereon, the flash projector 7 consisting of a flash discharge tube, a reflector and a diffusion plate, a charge switch 33, a synchronized trigger switch 34, a switch plate 35 integrated with the flash operation member 8, and a supporting plate 36 supporting the switch plate 35 and guiding to slide up and down thereon. The battery 19 is a power source of the flash unit 18. The flash unit 18 starts charging upon the charge switch 33 being turned on by sliding up the flash operation member 33, and projects a flash light upon the synchronized trigger switch 34 being turned on synchronously with the shutter blade 40 being opened.

The front cover 16 covers the front of the body basic portion 15, after the photographic mechanisms and the flash unit 18 are attached to the front of the body basic portion 15. The front cover 16 has openings formed through its front side, for exposing the objective window 6a of the viewfinder 6, the taking lens 5, the flash projector 7, and the flash operating member 8.

Before the photo film cartridge 20 is loaded in the film unit, a unit type code specific to the type of the film unit is optically printed as a latent image on a lateral side of the photo filmstrip 22. According to an embodiment of the present invention, the unit type code is utilized for determining correction values for correcting image data picked up from picture frames recorded on the photo filmstrip 22, to make photo-prints of the picture frames on the basis of the image data.

Figure 5:
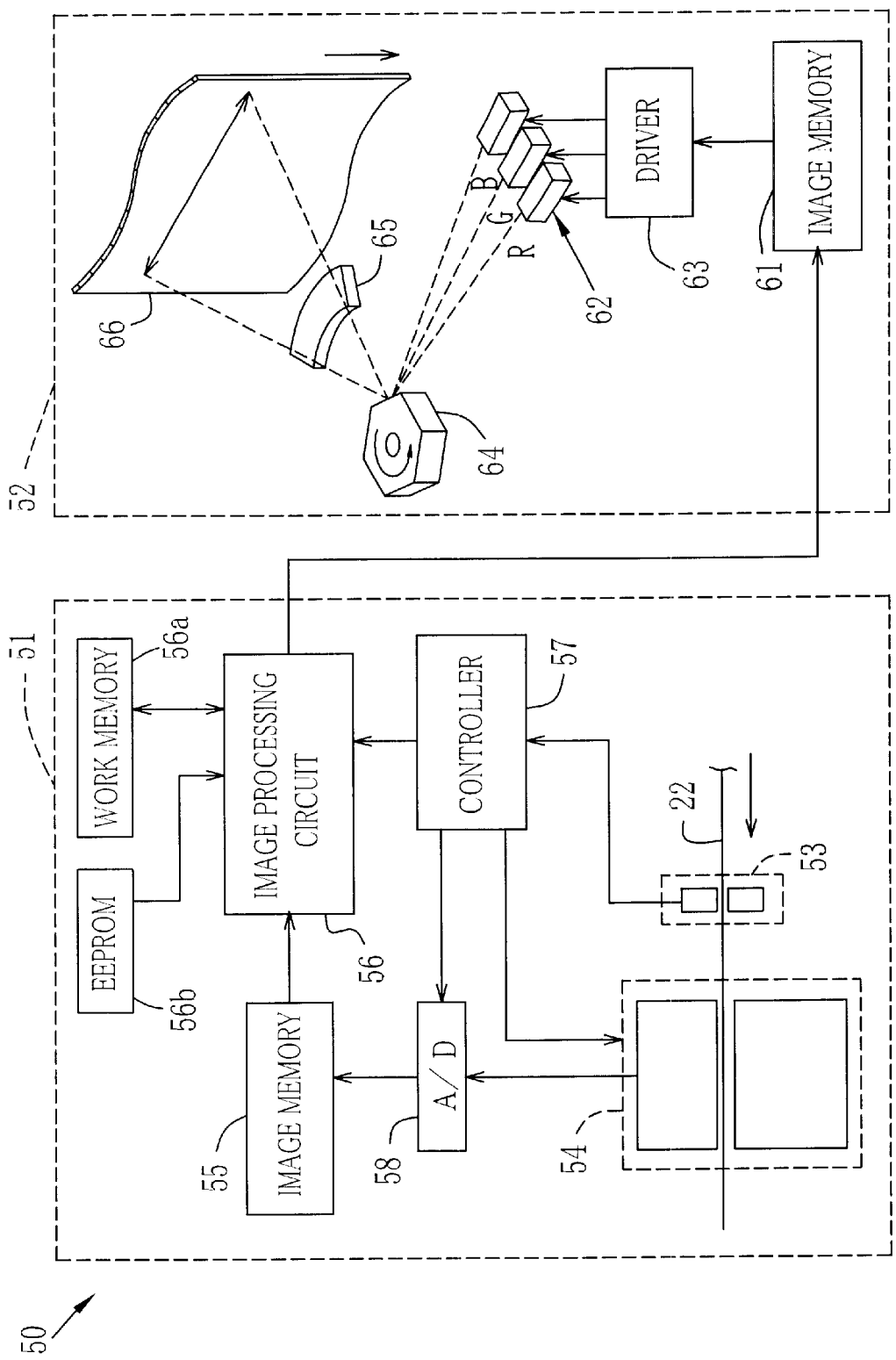
FIG. 5 is a block diagram illustrating a digital printer embodying the method of the present invention.

FIG. 5 shows a digital printer embodying the method of the present invention. The digital printer 50 is roughly constituted of an image input section 51 and an image printing section 52 for printing pictures on photographic paper. The image input section 51 functions as a correcting device, and is constituted of a code reader 53, a scanner 54 for picking up image data of a color picture from each exposure frame 22a on the photo filmstrip 22, an image memory 55, an image processing circuit 56 and a controller 57 for controlling these components.

When the photo filmstrip 22 as developed is placed in the digital printer 50, a not shown film advancing mechanism advances the photo filmstrip 22 toward the scanner 54 through the code reader 53. The code reader 53 consists of a light source for illuminating the photo filmstrip 22 and a photo sensor located across a film advancing path from the light source, though details of these components are not shown in the drawing. The photo sensor reads out the type code optically from the photo filmstrip 22 as it is advanced through the code reader 53, wherein the unit type code is developed to be a visible image concurrently with the photographed pictures. The code reader 53 reads out the unit type code once for each filmstrip, and sends data of the unit type code to the controller 57. The controller 57 transfers the unit type code to the image processing circuit 56.

The scanner 54 consists of a film carrier for holding the photo filmstrip 22 to be flat, an illuminating device that diffuses light from a lamp and illuminates the exposure frame 22a as being placed in the film carrier, a CCD, and an optical system for forming a color optical image of the photographed picture on the CCD, though details of these components are not shown in the drawing. The scanner 54 picks up photometric signals for red, green and blue from the color picture recorded in each of the exposure frames 22a, each after the photo filmstrip 22 is advanced by one frame, by converting the optical image into electric signals through the CCD according a three-color separation method. The scanner 54 sends the photometric signals to an A/D converter 58.

The A/D converter 58 converts the photometric signals into digital image data for each color. The three color image data is written on the image memory for each color. The image processing circuit 56 reads out the image data from the image memory 55 after the image data of one picture frame is written on the image memory 55, and processes the image data to be suitable for use in printing, and for improving quality of pictures as printed based on the processed image data. How to process the image data will be described in detail later.

To the image processing circuit 56 are connected a work memory 56a and an EEPROM 56b. The work memory 56a temporally stores data necessary for the image processing circuit 56 to perform the image processing. The EEPROM 56b stores correction parameters for use in correcting the image data, and conversion tables for converting the image data into exposure amount and vise versa. The correction parameters and the conversion tables are prepared for each of a plurality of predetermined film unit types, and are stored along with the corresponding unit type codes. The conversion tables are each individually produced according to characteristic curves of the photo filmstrip used in the corresponding film unit type. The image processing circuit 56 corrects the image data by means of those correction parameters and conversion tables which are determined by the unit type code read out through the code reader 53.

Since the EEPROM 56b is provided for storing correction parameters and conversion tables, it is possible to add a set of correction parameters and conversion tables for a new type film unit to the EEPROM 56b, when the new type film unit is brought into the market.

The image printing section 52 is constituted of an image memory 61, a laser unit 62 for emitting laser rays of red, blue and green, a driver 63 for driving the laser unit 62, a polygonal mirror 64, an F-θ lens 65, and a not-shown paper advancing mechanism for advancing a long web of color photographic paper 66 in a lengthwise direction thereof. The corrected image data from the image input section 51 is written on the image memory 61. The output of the laser unit 62 is controlled based on the corrected image data, to project laser rays toward the polygonal mirror 64 while it is turning at a high speed. As a result, the laser rays are scanned in a widthwise direction of the color photographic paper 66, that is perpendicular to the paper advancing direction. Thus a color image of the exposure frame 22a is printed line by line on the color photographic paper 66. After having the color image printed thereon, the color photographic paper 66 is developed in a not-shown photographic processing section, and is cut into a sheet of photo-print.

Now the detail of the image data correction in the image processing circuit 56 will be described.

According to a first embodiment of the present invention, the image data correction is intended to eliminate the influence of the inevitable decrease in illuminance in the marginal portions of the exposure frame 22a from the printed pictures, while taking account of the curvature of the film surface behind the exposure aperture.

As described with respect to the background art, the intensity of light decreases with radial distance from the optical axis 5a of the taking lens 5. As a result, even where the photographed subject has an uniform brightness, the exposure amount decreases in the marginal portions of the exposure frame 22a, as compared to a center point "0" of the exposure frame 22a, that is on the optical axis 5a of the taking lens 5. This phenomenon is based on the well-known $\cos^4$ law. Therefore, where the film surface is held flat in a focal plane of the taking lens 5, the decrease in illuminance in the marginal portions may be given by the following equation:

$$E1 = A \cdot L^2 + B \cdot L^4 \qquad (1)$$

wherein E1 represents an amount of decrease in illuminance at a position or point in the exposure frame 22a, that is located at a distance L from the center point "0", and A and B represent correction coefficients predetermined such that the correction amount E1 for the center point becomes zero.

Figure 6:
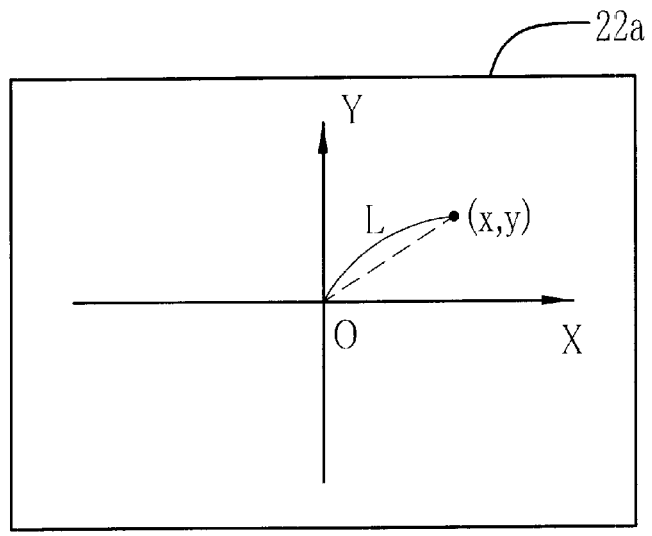
FIG. 6 is an explanatory diagram illustrating coordinates for addressing respective points in the exposure frame.

Any point in the flat exposure frame 22a may be addressed with coordinates values (x, y) in a coordinate system whose X-axis corresponds to the lengthwise direction of the photo filmstrip 22, and Y-axis crosses the X-axis at the center point "0" in the widthwise direction of the photo filmstrip 22, as shown in FIG. 6. Therefore, the radial distance L from the center point "0" may be given as follows:

$$L = \sqrt{(x^2 + y^2)}$$

wherein "x" and "y" respectively represent distances from the center point "0" in the lengthwise and widthwise directions of the exposure frame 22a.

Because the shutter speed or the exposure time is fixed in the same type of film unit, the decrease in illuminance at a point in the exposure frame is proportional to the decrease in exposure amount at that point in the same type film unit. Therefore, if the photo filmstrip 22 is held flat at the time of exposure, the decrease in exposure amount may be compensated for by correcting image data of each pixel in accordance with a value calculated based on the distance L of the individual pixel from the center point "0" according to the above equation (1).

However, where the photo filmstrip 22 is held forwardly convex along the lengthwise direction behind the exposure aperture, as in the film unit 2, illuminance in those marginal portions of the exposure frame 22a which are displaced from the focal plane toward the taking lens 5, are less decreased in comparison with the case where the photo filmstrip 22 is held flat in the focal plane. As the X-axis represents the lengthwise direction of the exposure frame 22a, the decrease in illuminance at a point (x, y) is lessened by an amount E2 that may be expressed as follows:

$$E2 = C \cdot x^2 + D \cdot x^4 \quad (2)$$

wherein C and D represent correction coefficients predetermined such that the correction amounts E2 for those points on the Y-axis become zero.

Consequently, a correction amount E for one pixel to be printed based on the image data picked up from a picture photographed by the film unit 2, may be determined as a relative value to a reference exposure value at the center point of the exposure frame 22*a* according to the follow formula, on the assumption that the reference exposure value is zero (0EV):

$$E = E1 + E2 = A \cdot L^2 + B \cdot L^4 + C \cdot x^2 + D \cdot x^4 \quad (3)$$

wherein $L = \sqrt{(x^2 + y^2)}$.

It is to be noted that the correction coefficients A to D are predetermined by calculating theoretic values of the correction amount E at a plurality of points in the exposure frame 22*a* on the basis of lens design data of the taking lens 5, the radius of curvature R and other data, and then applying these theoretic values and the coordinate values of these points to the method of least squares. Also, the correction coefficients A to D are determined to be positive or negative such that the correction amount E becomes negative for a point where the exposure amount is lower than a reference exposure amount that is obtained at the center point "0", when the subject brightness is uniform.

After calculating the correction amount E for each pixel of one picture frame according to the above equation (3), the image processing circuit 56 selects one of the conversion tables that is suitable for the characteristic curves of the photo filmstrip 22 as placed in the film scanner 54, according to the unit type code read out from the code reader 53, and converts the image data of each pixel into an exposure amount through the selected conversion table. Then, the image processing circuit 56 corrects the exposure amount with the correction amount E, and then converts the corrected exposure amount into image data through the selected conversion table. The image data obtained from the corrected exposure amount serves as the corrected image data. In this way, the image data is corrected to compensate for the decrease in illuminance in the marginal portions of the exposure frame 22*a* while taking account of the fact that the exposure frame 22*a* is held forwardly concave at the time of exposure.

It is possible to convert the correction amount E into exposure correction data through the conversion table, and then correct the image data with the exposure correction data of the corresponding pixel, to produce the corrected image data.

Now the overall operation of the film unit 2 and the digital printer 50 will be described.

Before the photo film cartridge 20 is loaded in the unit body 3 of the film unit 2, a unit type code representative of the type of the assigned film unit 2 is optically printed on the photo filmstrip 22 in the factory. After the unit body 3 is loaded with the photo filmstrip 22 and the cartridge shell 21, and is completely assembled, the label 4 is put around the unit body 3, to finish manufacturing the film unit 2.

To take pictures by the film unit 2, the film winding wheel 13 is turned to wind up the photo filmstrip 22 by one frame, thereby to place an unexposed exposure frame 22*a* behind the exposure aperture and cock the shutter mechanism at the same time. Thereafter, the photographer frames a subject through the viewfinder 6, and presses the shutter button 9. To make a flash photography, the photographer first slides up the flash operation member 8, and presses the shutter button 9 after the flash unit 18 is charged up. Upon the shutter button 9 being pressed, the shutter blade 40 is swung to open the shutter aperture 41, and then returns to the closing position according to the force of the spring 43.

While the shutter aperture 41 opens, the photographic light passing through the taking lens 5 enters the light-shielding chamber 24, so the exposure frame 22*a* as placed behind the exposure aperture is exposed. At that time, the film surface of the exposure frame 22*a* is held forwardly concave along the lengthwise direction of the photo filmstrip 22.

Pictures are photographed one after another in the same way as above. After the completion of all available exposures, the user turns the winding wheel 13 continuously till the entire length of the photo filmstrip 22 is wound up into the cartridge shell 21. Then, the film unit 2 is forwarded to a photo-lab or an agency of a photofinisher.

In the photo-lab, the photo film cartridge 20 containing the exposed photo filmstrip 22 is removed from the unit body 3, to pull out and remove the photo filmstrip 22 from the cartridge shell 21. The photo filmstrip 22 is developed and then placed in the digital printer 50.

The digital printer 50 advances the photo filmstrip 22 toward the scanner 54. While the photo filmstrip 22 is being advanced, the controller 57 reads out the unit type code on the photo filmstrip 22 through the code reader 53, and sends the unit type code to the image processing circuit 56.

Upon receipt of the unit type code, the image processing circuit 56 selects one from among the conversion tables stored in the EEPROM 56*b*, in correspondence with the unit type code. The image processing circuit 56 concurrently reads out the correction coefficients A to D, which are previously stored as the correction parameters in the EEPROM 56*b*, and then calculates correction amounts E for respective pixels of the exposure frame 22*a*, according to the above equation (3), by use of the correction coefficients A to D, while varying the values "x" and "y" individually by a predetermined step corresponding to the pixel pitch. The correction amounts E obtained in this way are written on the work memory 56*a*, to produce a correction table.

Because the correction amounts E becomes equal for the pixels located at the same radial distance L from the center point "0", i.e. the pixels whose coordinate values (x, y) are equal to one another in terms of absolute values, the correction table may be completed by calculating the correction amounts E only for those pixels whose coordinate values "x" and "y" are both positive, i.e. for those pixels located in the first quadrant of the coordinate system shown in FIG. 6.

Thereafter when the photo filmstrip 22 comes into the film carrier of the scanner 54, the photo filmstrip 22 stops. While the photo filmstrip 22 stops in the film carrier, a color picture recorded in the exposure frame 22*a* is read out by the scanner 54, and is converted into three color image data through the A/D converter 58. The three color image data is written on the image memory 55. When the image data of the entire exposure frame 22*a* has been written on the image memory 55, the image processing circuit 56 reads out the image data one pixel after another in a predetermined sequence by addressing the respective pixel.

Each time the image processing circuit 56 reads out the image data of one pixel, the image processing circuit 56 converts the image data of one pixel into an exposure amount through the conversion table that is selected according to the unit type code. The image processing circuit 56 also selects one of the correction amounts E for that pixel from the correction table according to the position of that pixel in the exposure frame 22a, for example, by use of the address of that pixel in the image memory 55. The image processing circuit 56 corrects the exposure amount obtained through the conversion table from the image data, with the correction amount E selected for that pixel. In this way, a corrected exposure amount is obtained for that pixel.

Thereafter, the image processing circuit 56 converts the corrected exposure amount through the selected conversion table, thereby to obtain corrected image data that corresponds to the corrected exposure amount. Consequently, the image data is corrected with the correction data that corresponds to the correction amount E. The corrected image data is written on the work memory 56a.

After the correction process for the image data of one pixel is carried out in this way, the image data of a next pixel is read out from the image memory 55, and is corrected in the same way as above. Corrected image data of the next pixel is written on the work memory 56a. The image data of other pixels of the exposure frame 22a is seriatim read out from the image memory 55, and is corrected in the same way as above. Subsequently corrected image data is seriatim written on the work memory 56a.

When the correction process is accomplished on the three color image data of all pixels of one frame, the corrected image data, as written on the work memory 56a, is subjected to ordinary image processing, such as color correction and negative-positive reversion process. It is possible to correct chromatic aberration, distortion and the like concurrently with the ordinary image processing. Thereafter, the image processing circuit 56 writes the corrected image data on the image memory 61 of the image printing section 52.

The image processing section 52 drives the laser unit 62 on the basis of the corrected three color image data of one frame as written on the image memory 61, to print the color picture as a latent image on the color photographic paper 66.

After the color picture of one frame starts being printed, the next exposure frame 22a is placed in the scanner 54, and the correction process is executed in the same procedure as above. It is to be noted that the same correction table as produced initially with reference to the unit type code of the photo filmstrip 22 is used for the correction process of the next and following exposure frames 22a of the same photo filmstrip 22. After the correction process is accomplished on the entire image data of the next frame, the corrected image data is subjected to the ordinary image processing, and then written on the image memory 61 of the image printing section 52. After the printing of the preceding color picture is completed, the next color picture is printed on the color photographic paper 66 on the basis of the corrected image data.

In this way, image data is picked up from the respective exposure frames 22a of the photo filmstrip 22, and is subjected to the correction process and the ordinary image processing, so color pictures are printed on the color photographic paper 66 on the basis of the corrected image data.

After having the color pictures printed thereon, the color photographic paper 66 is forwarded to the photographic processing section, where the color photographic paper 66 is developed, fixed and dried, and then cut into the individual pictures, which are ejected as photo-prints from the digital printer 50. Since the pictures are printed on the basis of the image data that is corrected in the way to compensate for the decrease in illuminance in the marginal portions of the exposure frames 22a while taking account of the curvature of the film surface at the exposure, the image quality of the printed pictures is well improved.

EXAMPLE 1

To prove the effects of the image data correcting method of the above embodiment, an experiment was carried out by use of a film unit 2 in which the photo filmstrip 22 is curved forwardly concave along the lengthwise direction of the exposure frame 22a at a radius of curvature R of 100 mm. Based on the radius of curvature R and lens design data of the taking lens 5 of that film unit 2, theoretic values of the correction amounts E were calculated with respect to 13 sampling points in the exposure frame 22a, including the center point "0" on the optical axis 5a. Thereafter, based on the theoretic values, correction coefficients A to D for the above equation (3) were determined according the least square method. The correction coefficients A to D had the following values:

$A = -2.357 \times 10^{-3}$ $B = -1.692 \times 10^{-7}$ $C = +4.270 \times 10^{-3}$ $D = -1.343 \times 10^{-5}$ Using these correction coefficients A to D and the respective coordinate values (x, y) of the thirteen points in the exposure frame 22a, the correction amounts E at the respective points were calculated for the above mentioned film unit 2. The results are shown in Table 1, wherein the coordinate values "x" and "y" are expressed in the unit of millimeter, and the correction amounts E are given as relative exposure values to the reference value (0 EV) at the center point of the exposure frame 22a. Needless to say, on the actual correction process, a correction table is produced by calculating correction amounts E for individual pixels of the entire area of the exposure frame 22a, though Table 1 shows only the correction amounts E for the thirteen points.

TABLE 1

| Correction Amount E | | X-axis Coordinate | | | |
|---|---|---|---|---|---|
| | | −16.4 | −8.2 | 0 | +8.2 | +16.4 |
| Y-axis Coordinate | +11.25 | −0.770 | | −0.301 | | −0.770 |
| | +5.625 | | −0.0076 | | −0.0076 | |
| | 0 | −0.469 | | 0 | | −0.469 |
| | −5.625 | | −0.0076 | | −0.0076 | |
| | −11.25 | −0.770 | | −0.301 | | −0.770 |

Thereafter, decreases in exposure amount of the exposure frame 22a in its marginal portions were measured, for comparison with the correction amounts E obtained according to the above equation (3). A specific camera was used for this measurement, that has the same configurations as the above film unit: having the same taking lens, holding the photo filmstrip curved behind the taking lens at the same radius of curvature, and so forth, but the specific camera is configured to prevent unevenness of exposure that could be caused by the open-close movement of the shutter blade. By this specific camera, a sample with an uniform brightness was photographed on a negative photo filmstrip, and densities of the photographed negative image were measured after development, to obtain decreased amounts of exposure in the marginal portions. The results at the same sampling points are shown in Table 2 in the same format as Table 1.

TABLE 2

| Decrease In Exposure | | X-axis Coordinate | | | | |
| --- | --- | --- | --- | --- | --- | --- |
| | | −16.4 | −8.2 | 0 | +8.2 | +16.4 |
| Y-axis Coordinate | +11.25 | −0.771 | | −0.302 | | −0.770 |
| | +5.625 | | −0.0075 | | −0.0077 | |
| | 0 | −0.469 | | 0 | | −0.469 |
| | −5.625 | | −0.0075 | | −0.0077 | |
| | −11.25 | −0.772 | | −0.300 | | −0.768 |

As seen from the above results, the correction amounts E obtained according to the calculation formula (3) are approximately equal to the actually measured decreased exposure amounts. Therefore, with the calculated correction amounts E, influence in the image quality by the decrease in exposure amount in the marginal portions of the exposure frame is sufficiently eliminated while taking account of the curvature of the film surface at the exposure.

Now a second embodiment of the present invention will be described. In the second embodiment, image data correction is intended to eliminate the influence of the positional unevenness in exposure time that the kickoff type shutter mechanism involves, as well as the influence of the decrease in exposure amount in the marginal portions of the exposure frame 22a that the taking lens 5 involves.

Because the image data correction method of the second embodiment is applicable to the same film unit and digital printer as described with respect to the first embodiment, the following description relates to only those features essential for the second embodiment, and the same reference numbers will be used for the same or equivalent elements as the first embodiment.

Figure 9:
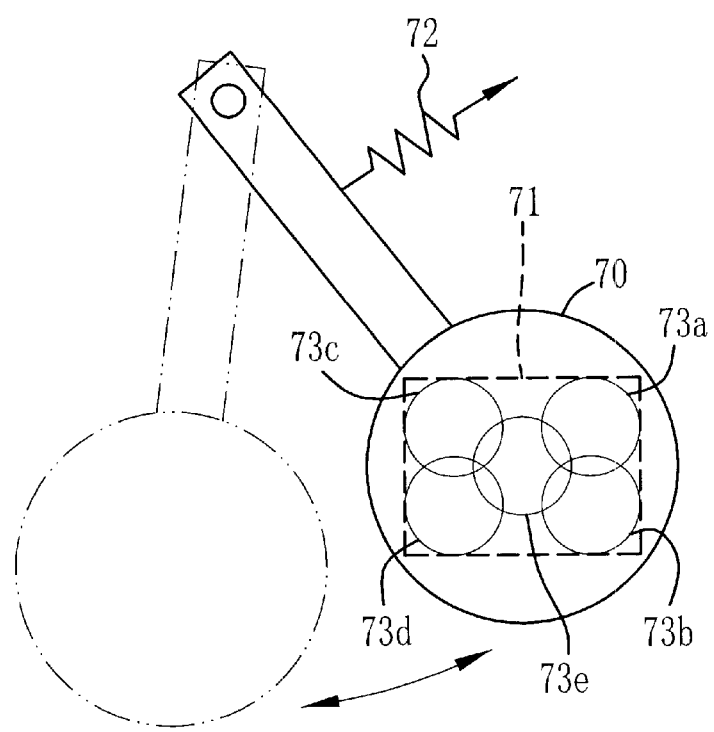
FIG. 9 is an explanatory diagram for explaining the positional unevenness in exposure time within the exposure frame, that is resulted from the swing of the shutter blade.

As set forth above with reference to FIG. 9, because of a spacing between the stop aperture 31 and the shutter blade 40, the photographic light projected from the stop aperture 31 toward the exposure frame 22a passes through the shutter aperture 41 as a plurality of bundles of rays which are displaced from each other in the plane perpendicular to the optical axis 5a of the taking lens, and thus in the shutter aperture 41. Since the shutter blade 40 of the kickoff type makes a reciprocating movement to open and then close the shutter aperture 41, the exposure frame 22a is exposed for locally different times.

Figure 7:
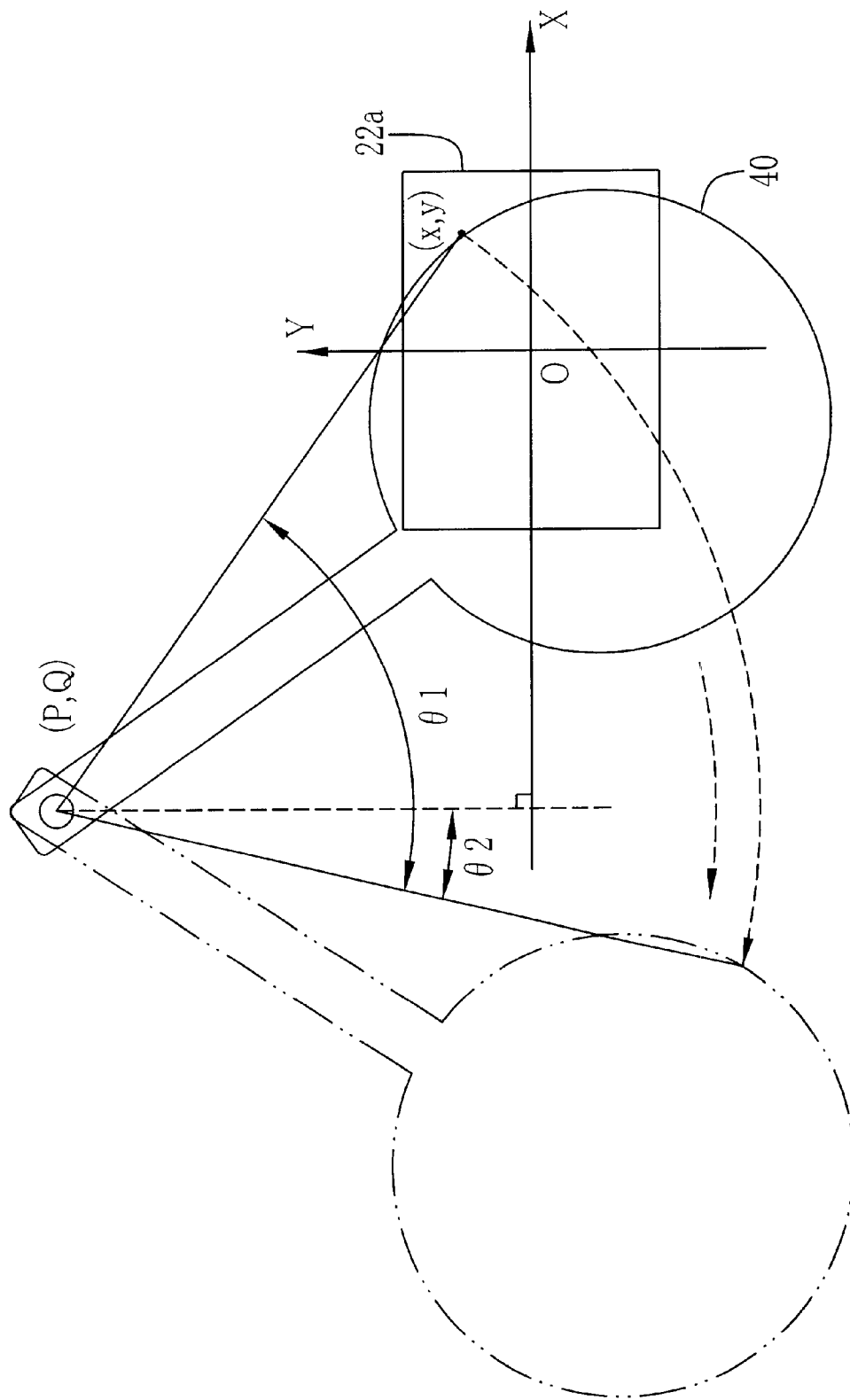
FIG. 7 is an explanatory diagram illustrating angular positions of a swinging shutter blade in relation to the exposure frame, for explaining an image correction method according to a second embodiment of the present invention.

To compensate for such positional unevenness in exposure time or shutter speed within the exposure frame 22a, the second embodiment makes use of the fact that an exposure time at any appropriate point in the exposure frame 22a may be calculated on the basis of a rotational angle θ1 of the shutter blade 40 from an angular position where the photographic light is allowed to fall on that point to the maximum opening position, as shown in FIG. 7. This is because the exposure time at the appropriate point in the exposure frame 33a corresponds to the time taken for the shutter blade 40 to swing through an angle "2·θ1".

Because the photographic light practically has a width in the plane in which the shutter blade 40 swings, it is difficult to define the exact rotational position of the shutter blade 40 where the photographic light is allowed to fall on the appropriate point. In the present embodiment, the angular position where the photographic light is allowed to fall on the appropriate point in the exposure frame 22a is defined to be a mean value between an angular position where a fragment of the photographic light starts falling on that point and an angular position where the entire photographic light starts falling on that point.

The rotational angle θ1 may be geometrically calculated by use of coordinate values (x,y) of the appropriate point in the exposure frame 22a in orthogonal coordinates, and coordinate value (P, G) of a rotary axis of the shutter blade 40 in the same coordinate plane as the coordinate values (x,y), wherein the film surface is assumed to be held flat in the coordinate plane, and the X-axis corresponds to the lengthwise direction of the exposure frame 22a, whereas the Y-axis crosses the X-axis at the center point "0" of the exposure frame 22a, that is on the optical axis 5a of the taking lens 5.

The rotational angle θ1 may be converted into an exposure time, and the exposure time may be converted into an exposure value (EV). Thus, a correction amount E3 for compensating for the positional unevenness in exposure time may be obtained at any point in the exposure frame 22a, as a difference between an exposure value calculated from the rotational angle θ1 for that point and an exposure value for the center point "0" of the exposure frame 22a, in accordance with the following equation:

$$E3 = K \cdot \log_2(M \cdot \{\tan^{-1}((P-x)/(Q-y))\} + S) + G \quad (4)$$

wherein K, M, P, Q, S and G are correction parameters which are defined as follows:

P: an X-coordinate value of the rotary axis of the shutter blade in the above defined coordinate plane;

Q: a Y-coordinate value of the rotary axis of the shutter blade in the above defined coordinate plane;

S: a correction value including a rotational angle of said shutter blade from an angular position where said shutter blade reaches after fully opening said shutter aperture as swinging in said opening direction, to a maximum opening position at which said shutter blade starts swinging in said closing position (an angle θ2 in the example of FIG. 7, between a line extending perpendicularly from the rotary axis of the shutter blade to the X-axis and a line corresponding to the maximum opening position of the shutter blade) and a correction amount for taking account of the fact that the rotational angle of said shutter blade are projected onto said coordinate plane; as well as a correction amount considering the fact that this rotational angle is projected onto the coordinate plane;

M: a correction coefficient for converting a rotational angle of the shutter blade into an exposure time;

K: an appropriately determined proportional coefficient for logarithmic conversion; and G: a correction value for setting the value E3 to zero for the center point "0".

In the above equation (4), the rotational angle θ1 is calculated by adding the correction value S to a value "$\tan^{-1}\{(P-x)/(Q-y)\}$", and is converted into an exposure time by being multiplied by the correction coefficient M. By obtaining a logarithmic value with the base "2" from the exposure time, the exposure time is converted into an exposure value. After multiplying the exposure value by the proportional coefficient K to correct the exposure value to be an appropriate value, the correction value G is added to the corrected exposure value, to provide the correction amount E3 as a relative value to the exposure value for the center point "0" of the exposure frame 22a. It is to be noted that the unit of the value "$\tan^{-1}\{(P-x)/(Q-y)\}$" is radian.

Since the image data correction in the second embodiment is intended to eliminate the influence of the positional unevenness in exposure time as well as the influence of the decrease in illuminance with the radial distance from the center point of the exposure frame 22a, the image processing circuit 56 calculates an correction amount Eα for each pixel in accordance with the following equation:

$$E\alpha = E1 + E2 + E3 = A \cdot L^2 + B \cdot L^4 + C \cdot x^2 + D \cdot x^4 + K \cdot \log_2(M \cdot \{\tan^{-1}((P-x)/(Q-y))\} + S) + G \quad (5)$$

Also in the second embodiment, the correction amount Eα is determined to have a negative value for a point where the exposure amount is lower than a reference exposure amount obtained at the center point, or a positive value for a point where the exposure amount is higher than the reference exposure amount, on the assumption that the subject brightness is uniform. In other words, the correction parameters are defined such that the correction amount Eα for the center point becomes zero.

Like the correction coefficients A to D, the correction parameters P, Q, S, M, K and G are appropriately predetermined according to the configurations of the respective types of the film units. More specifically, correction parameters A to D, P, Q, S, M, K and G are determined by calculating theoretic values of the correction amounts Eα at a plurality of points in the exposure frame 22a according to the focal length of the taking lens, the spacing between the stop aperture and the shutter blade, the shape of the shutter blade, the radius of curvature R of the film surface behind the exposure aperture, and other kinds of design data of the taking lens and the shutter mechanism, and then applying the respective theoretic values and coordinate values of the associated points to the least square method.

A plurality of sets of correction parameters A to D, P, Q, S, M, K and G as predetermined in this way for different film unit types are previously stored in the EEPROM 56b. Also conversion tables for converting image data into exposure values or vise versa are predetermined for the respective film unit types, and are stored in the EEPROM 56b.

Now the operation of the image processing circuit 56 in the second embodiment will be briefly described.

Upon receipt of the unit type code, the image processing circuit 56 selects one from among the conversion tables stored in the EEPROM 56b, in correspondence with the unit type code read out from the photo filmstrip 22 through the code reader 53. The image processing circuit 56 concurrently selects a set of these correction parameters A to D, P, Q, S, M, K and G in accordance with the unit type code. Then the image processing circuit 56 calculates correction amounts Eα for respective pixels of the exposure frame 22a, according to the above equation (5), by use of the selected correction parameters, while varying the values "x" and "y" individually by a predetermined step. The correction amounts Eα obtained in this way are written on the work memory 56a, to produce a correction table.

Thereafter while the exposure frame 22a is positioned in the film carrier, three color densities of a color picture recorded in the exposure frame 22a are detected by the scanner 54, and is converted into three color image data through the A/D converter 58. The three color image data is written on the image memory 55. When the image data of the entire exposure frame 22a has been written on the image memory 55, the image processing circuit 56 reads out the image data one pixel after another in a predetermined sequence.

Each time the image processing circuit 56 reads out the image data of one pixel, the image processing circuit 56 converts the image data of one pixel into an exposure value through the selected conversion table. The image processing circuit 56 also selects one of the correction amounts E for that pixel from the correction table according to the position of that pixel in the exposure frame 22a, and corrects the exposure value, as obtained through the conversion table from the image data, with the selected correction amount E. In this way, a corrected exposure value is obtained for that pixel.

Thereafter, the image processing circuit 56 converts the corrected exposure value into corrected image data through the selected conversion table. Consequently, the image data is corrected with the correction data that corresponds to the correction amount Eα. The corrected image data is written on the work memory 56a.

After the correction process for the image data of one pixel is carried out in this way, the image data of a next pixel is read out from the image memory 55, and is corrected in the same way as above. Corrected image data of the next pixel is written on the work memory 56a. The image data of other pixels of the exposure frame 22a is seriatim read out from the image memory 55, and is corrected in the same way as above. Subsequently corrected image data is seriatim written on the work memory 56a.

When the correction process is accomplished on the three color image data of all pixels of one frame, the corrected image data, as written on the work memory 56a, is subjected to ordinary image processing, such as color correction and negative-positive reversion process. It is possible to correct chromatic aberration, distortion and the like concurrently with the ordinary image processing. Thereafter, the image processing circuit 56 writes the corrected image data on the image memory 61 of the image printing section 52.

In this way, pictures are printed on the basis of the image data that is corrected in the way to compensate for the unevenness of exposure that is resulted from the open-close movement of the kickoff type shutter mechanism as well as the decrease in illuminance in the marginal portions of the exposure frames 22a, while taking account of the fact that the film surface is held forwardly concave at the exposure. Consequently, the image quality of the printed pictures is still more improved.

EXAMPLE 2

To prove the effects of the image data correcting method of the second embodiment, an experiment was carried out by use of a film unit 2 in which the photo filmstrip 22 is curved forwardly concave along the lengthwise direction of the exposure frame 22a at a radius of curvature R of 100 mm. Based on the radius of curvature R and design data of the taking lens 5 and the shutter blade 40 of the film unit 2, including the shape of the shutter blade 40, theoretic values of the correction amounts Eα were calculated with respect to 13 sampling points in the exposure frame 22a, including the center point "0" on the optical axis 5a.

Concretely, the theoretic value of the correction amount Eα for each sampling point was calculated in the following steps:

1) An initial opening angle θa of the shutter blade 40 where a first fragment of a bundle of rays traveling toward a sampling point begins to enter the shutter aperture 41, and a full opening angle θb of the shutter blade 40 where the entire bundle of rays traveling toward the same sampling point begins to enter through the shutter opening 41 were detected for each of the thirteen sampling points, on the premise that the rotational angle of the shutter blade 40 at the closing position is 0°.

2) A mean angle θc, θc=(θa+θb)/2, between the initial opening angle θa and the full opening angle θb was detected for each sampling point, as the angular position of the shutter blade 40 where the photographic light is allowed to fall on the respective sampling point.

3) Based on the mean angle θc of each sampling point and a rotational angle θ0 of the shutter blade 40 from the closing position through the maximum opening position, an exposure angle θd was calculated: θd=(θ0−θc)·2. In this instance, the rotational angle θ0 is 45°.

4) Regarding the exposure angle θd for the center point of the exposure frame 22a as a reference value, a ratio of the exposure angle θd for each of other sampling points to the reference value was calculated, which is called an exposure time ratio Te.

5) On the basis of the $\cos^4$ law and the radius of curvature R of the film surface, illuminance of the photographic light from the taking lens 5 was calculated for each sampling position, and a ratio of the illuminance at each sampling point to the illuminance at the center point of the exposure frame 22a was detected as a lens illuminance Fα for the respective sampling point.

6) The exposure time ratio Te was multiplied by the lens illuminance Fα for each of the sampling point, to obtain a ratio of exposure amount at each sampling point to a reference exposure amount at the center point, which is referred to as an image surface illuminance ratio α:α=Te·Fα.

7) A logarithm with the base of "2" of the image surface illuminance ratio α, i.e. $\log_2(\alpha)$, is obtained as the theoretic value of the correction amount Eα for each sampling point.

Figure 8B:
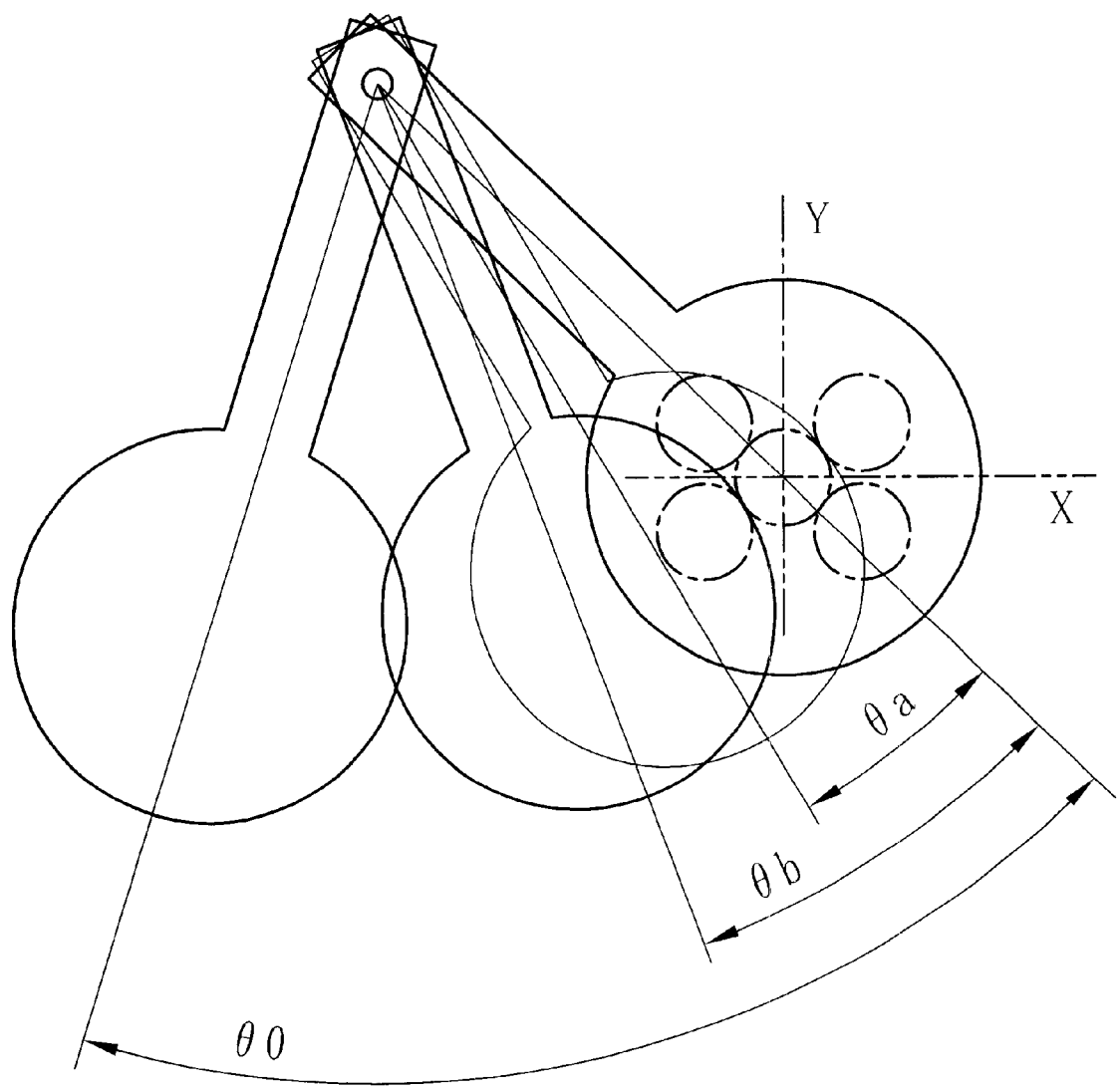
FIG. 8B is an explanatory diagram illustrating an initial opening angle and a full opening angle of a shutter blade for a center point of the exposure frame.

FIG. 8A shows the respective values θa, θb, θc, θd, Te, Fα, α and the theoretic values $\log_2(\alpha)$ for the respective sampling points whose coordinate values are shown in Table 4 in the unit of millimeter. FIG. 8B shows the initial opening angle θa and the full opening angle θb for the center point of the exposure frame, as well as the rotational angle θc from the closing position to the maximum opening position of the shutter blade.

TABLE 4

|  |  | X-axis Coordinate | | | | |
|---|---|---|---|---|---|---|
|  |  | −16.4 | −8.2 | 0 | +8.2 | +16.4 |
| Y-axis Coordinate | +11.25 | SAMPLE 7 |  | SAMPLE 8 |  | SAMPLE 1 |
|  | +5.625 |  | SAMPLE 12 |  | SAMPLE 9 |  |
|  | 0 | SAMPLE 6 |  | SAMPLE 13 |  | SAMPLE 2 |
|  | −5.625 |  | SAMPLE 11 |  | SAMPLE 10 |  |
|  | −11.25 | SAMPLE 5 |  | SAMPLE 4 |  | SAMPLE 3 |

On the basis of the theoretic values of the correction amounts Eα obtained from the above Table 3, the correction parameters for the above calculation formula (5) were determined by the least square method. The results were as set forth below:

A=−2.357×10⁻³

B=−1.692×10⁻⁷

C=+4.270×10⁻³

D=−1.343×10⁻⁵

P=−20.58

Q=+15.01

M=+1.5870

K=−10.4634

S=+35.3847

G=+60.3988

Using these values A to D, P, Q, M, K, S and G as well as the respective coordinate values (x, y) of the sampling points in the exposure frame 22a, the correction amounts Eα at the respective points were calculated. The results are shown in Table 5. Furthermore, errors in the calculated correction amounts Eα from the corresponding theoretic values are shown in Table 6. In Tables 5 and 6, the correction amounts Eα are expressed as exposure values. Needless to say, on the actual correction process, a correction table is produced by calculating correction amounts Eα for individual pixels of the entire area of the exposure frame 22a, though Table 5 shows only the correction amounts Eα for the thirteen points.

TABLE 5

|  |  | X-axis Coordinate | | | | |
|---|---|---|---|---|---|---|
| Correction Amount Eα |  | −16.4 | −8.2 | 0 | +8.2 | +16.4 |
| Y-axis Coordinate | +11.25 | −0.83 |  | −0.10 |  | −0.55 |
|  | +5.625 |  | −0.02 |  | −0.13 |  |
|  | 0 | −0.76 |  | 0 |  | −0.36 |
|  | −5.625 |  | −0.18 |  | −0.01 |  |
|  | −11.25 | −1.12 |  | −0.42 |  | −0.78 |

TABLE 6

| Error From Theoretic |  | X-axis Coordinate | | | | |
|---|---|---|---|---|---|---|
| Value |  | −16.4 | −8.2 | 0 | +8.2 | +16.4 |
| Y-axis Coordinate | +11.25 | 0.02 |  | 0.05 |  | 0.00 |
|  | +5.625 |  | −0.13 |  | 0.02 |  |
|  | 0 | 0.00 |  | 0 |  | 0.00 |
|  | −5.625 |  | −0.03 |  | 0.14 |  |
|  | −11.25 | 0.07 |  | −0.05 |  | −0.10 |

As obvious from the results shown in Table 6, the errors in the correction amounts Eα calculated according to the formula (5) are very small with reference to the theoretic values. Therefore, the calculated correction amounts Eα are useful for correcting image data to eliminate the influence of the unevenness of exposure in the original picture from the printed picture. If there is a remarkable error from the theoretic value in some point in the exposure frame 22a, or if the correction amounts are to be balanced with particular intention, it is possible to modify respective values of the correction parameters for balancing the correction amounts by varying weight on the respective points relative to the entire exposure frame at the time of calculating the correction parameters according to the least quarter method.

Although the second embodiment is supposed to compensate for the unevenness of exposure resulted from the swinging movement of the shutter blade at the exposure, concurrently with the decrease in exposure amount in the marginal portions, it is possible to compensate for the positional unevenness in exposure time resulted from the movement of the shutter blade alone by use of the correction amounts E3 obtained according to the equation (4). Furthermore, the image correction method may be applicable to other types of shutter mechanisms that do not use the kickoff type shutter blade, insofar as they involve the problem of positional unevenness in exposure time. For example, the present invention is applicable to a shutter mechanism using a pair of shutter blades.

In the above described embodiments, the correction parameters are selected according to the unit type code as printed on one side of the photo filmstrip and read out through the code reader, it is possible to input the unit type code manually or mechanically through another data input device, such as a keyboard or a bar code reader for reading a bar code on the cartridge shell. It is also possible to utilize another code or information insofar as it is usable for determining the correction parameters. For example, a correction code specific for determining the correction parameters may be printed on the photo filmstrip, the cartridge shell or another appropriate portion. In that case, the same correction code may be assigned to those film units to which the same correction table and the conversion table are to be applied, even through their film unit types are different. The correction code may directly represent the correction parameters. In alternative, the correction code may merely represents a command for executing the correction process, so the correction process is executed by use of predetermined correction parameters upon receipt of this correction code.

Although the above described embodiments relate to a case where the image data correction is carried out for pictures photographed by the film units, the present invention is applicable to those pictures photographed by compact cameras or other cameras. Indeed the 135-type photo film cartridges loaded in the cameras are not usable for determining suitable correction parameters for the respective camera types, but it is possible to manually input the camera type or a corresponding correction code in the digital printer if only the photographer informs the photofinisher of the camera type at the order of printing. Therefore, it is possible to correct image data of photographic pictures in accordance with the type of the used camera.

Furthermore, the present invention is applicable not only to the 135-type photo filmstrip, but also to other types of photo filmstrip, including the IX240 type as used in the Advanced Photo System. Since the IX240 type photo filmstrip is provided with a transparent magnetic recording layer, the unit type code or the correction code may be recorded on the magnetic recording layer where the photo filmstrip is to be loaded in the film unit. Since there are cameras in the Advanced Photo System that can record data on the magnetic recording layer of the loaded photo filmstrip, the correction code, it is possible to design the camera to record the camera type code or the like on the magnetic recording layer.

Although the present invention has been described with respect to the image data correction for the digital printer that prints pictures on photographic paper, the present invention is applicable to other printing devices, and also to a separate image data correction device.

Thus, the present invention is not to be limited to the above embodiments but, on the contrary, various modification will be possible to those skilled in the art without departing from the scope of claims appended hereto.

What is claimed is:

1. A method of correcting image data picked up from a frame photographed on a photo filmstrip through a taking lens, wherein said photo filmstrip is curved along a direction to be concave on the side of said taking lens with a center point of said frame located on an optical axis of said taking lens in a focal plane of said taking lens when said frame is photographed, said method comprising the steps of:

determining a first kind of correction amount for each pixel of said picture, to compensate for decrease in exposure amount that results from decrease in illuminance in a focal plane of said taking lens with radial distance from an optical axis of said taking lens, provided that said photo filmstrip is held flat in said focal plane when said frame is photographed:

determining a second kind of correction amount for each pixel of said picture on the basis of increase in illuminance in those portions of said frame which are shifted from said focal plane toward said taking lens as a result of the curvature of said photo filmstrip behind said taking lens; and correcting image data of each pixel in accordance with an exposure correction amount obtained from said first and second kinds of correction amounts.

2. A method of correcting image data as recited in claim 1, wherein said first and second kinds of correction amounts are calculated according to the following equations:

$$E1 = A \cdot L^2 + B \cdot L^4,$$

wherein $L = \sqrt{(x^2 + y^2)}$ $$E2 = C \cdot x^2 + D \cdot x^4$$

wherein E1 and E2 represent said first and second kinds of correction amounts for a pixel picked up from an appropriate point in said frame, L represents a radial distance of said appropriate point from said center point of said frame, "x" and "y" respectively represent coordinates values of said appropriate point in orthogonal X-Y coordinates whose plane corresponds to said focal plane, whose X-axis corresponds to said curved direction of said photo filmstrip, and whose Y-axis crosses the X-axis at said center point of said frame, provided that said photo filmstrip is held flat in said focal plane, and A to D represent correction coefficients.

3. A method of correcting image data as recited in claim 2, wherein said correction coefficients A and B are predetermined such that said first kind of correction amount E1 becomes zero for said center point, whereas said correction coefficients C and D are predetermined such that said second kind of correction amounts E2 become zero for those points which are on the Y-axis in said coordinate plane.

4. A method of correcting image data as recited in claim 3, wherein said correction coefficients are predetermined by calculating theoretic values of said exposure correction amounts for a plurality of predetermined sampling points in said frame, on the basis of design data of said taking lens and a radius of curvature of said photo filmstrip behind said taking lens, and by applying said theoretic values and coordinate values of said sampling points in said coordinate plane to a least square method.

5. A method of correcting image data as recited in claim 4, wherein a plurality of sets of said correction coefficients are predetermined for different types of lens-fitted photo film units, and a code is assigned to said photo filmstrip when said photo filmstrip is loaded in one type of said film units, for selecting a corresponding set of said correction parameters to said one film unit type with reference to said code on calculating said exposure correction amounts.

6. A method of correcting image data picked up from a frame photographed on a photo filmstrip through a taking lens while a shutter mechanism opens a shutter opening, said method comprising the steps of:
   calculating an exposure correction amount for a respective pixel of said picture on the basis of correction parameters predetermined in accordance with factors of said shutter mechanism that cause positional unevenness in exposure time within said frame of said photo filmstrip; and
   correcting image data in accordance with said exposure correction amount for each pixel.

7. A method of correcting image data as recited in claim 6, wherein said shutter mechanism comprises a shutter blade that swings about a rotary axis in a perpendicular plane to an optical axis of said taking lens in an opening direction to open said shutter aperture till said shutter blade reaches a maximum opening position past a full opening position where said shutter aperture is fully opened, and thereafter in a closing direction to close said shutter aperture.

8. A method of correcting image data as recited in claim 7, wherein said exposure correction amount is calculated according to the following equation, assuming that said photo filmstrip is held flat in a focal plane of said taking lens with a center point of said frame located on said optical axis when said frame is photographed:

$$E3 = K \cdot \log_2(M \cdot \{\tan^{-1}((P-x)/(Q-y))\} + S) + G$$

wherein
   E3 represents said exposure correction amount for a pixel picked up from an appropriate point in said frame;
   "x" and "y" represent coordinate values of said appropriate point in orthogonal X-Y coordinates whose plane corresponds to said focal plane of said taking lens and whose axes cross at said optical axis of said taking lens; and
   P, Q, S, M, K and G represent said correction parameters which are defined as follows:
      P: an X-coordinate value of said rotary axis of said shutter blade in said coordinate plane;
      Q: a Y-coordinate value of said rotary axis of said shutter blade in said coordinate plane;
      S: a correction value including a rotational angle of said shutter blade from an angular position that is after said full opening position in said opening direction, to said maximum opening position, and a correction amount for considering that the rotational angle of said shutter blade are projected onto said coordinate plane;
      M: a correction coefficient for converting the rotational angle of said shutter blade into an exposure time;
      K: a proportional coefficient for logarithmic conversion; and
      G: a correction value for setting said exposure correction amount to zero for said center point.

9. A method of correcting image data as recited in claim 8, wherein said correction parameters are predetermined by calculating theoretic values of said exposure correction amounts for a plurality of predetermined sampling points in said frame, and by applying said theoretic values and coordinate values of said sampling points in said coordinate plane to a least square method.

10. A method of correcting image data as recited in claim 9, wherein a plurality of sets of said correction parameters are predetermined for different types of lens-fitted photo film units, and a code is assigned to said photo filmstrip when said photo filmstrip is loaded in one type of said film units, for selecting a corresponding set of said correction parameters to said one film unit type with reference to said code on calculating said exposure correction amounts.

11. An apparatus for correcting image data picked up from a frame photographed on a photo filmstrip through a photographic device, characterized by comprising:
   a memory device that previously stores correction parameters predetermined with regard to those factors involved in said photographic device which cause unevenness of exposure in said frame;
   a calculation device for calculating an exposure correction amount for a respective pixel of said picture on the basis of said correction parameters and a relative position of said respective pixel in said frame to an optical axis of a taking lens of said photographic device, assuming that a center point of said frame is located on said optical axis in a focal plane of said taking lens when said frame is photographed; and
   an image data processing device for correcting said image data in accordance with said exposure correction amount for each pixel;
   wherein said photo filmstrip is curved along a direction relative to said focal plane with its concave side facing said taking lens when said frame is photographed, and said calculation device calculates an exposure correction amount E that is intended to compensate for decrease in exposure amount in marginal portions of said frame, the exposure correction amount E being based at least in part on the curvature of the photo filmstrip relative to the focal plane.

12. An apparatus of correcting image data as recited in claim 11, further comprising a data input device for inputting data of said photographic device as used for photographing said frame, wherein said memory device stores a plurality of sets of said correction parameters which are predetermined for different types of photographic devices, and said calculation device selects a set of said correction coefficients from among said plurality of sets in accordance with the type of photographic device represented by data input through said data input device.

13. An apparatus of correcting image data as recited in claim 12, further comprising a second memory device for storing said exposure correction amounts calculated for one frame in association with said relative positions of said respective pixels in said frame as a correction table.

14. An apparatus of correcting image data as recited in claim 11, wherein said calculation device calculates the exposure correction amount E according to the following formula:

$$E = (A \cdot L^2 1 B \cdot L^4) 1 (C \cdot x^2 1 D \cdot x^4)$$

wherein L-√(x²1y²), L represents a radial distance of an appropriate point in said frame from said center point, provided that said photo filmstrip is held flat in said focal plane, "x" and "y" respectively represent coordinates values of said appropriate point in orthogonal X-Y coordinates whose plane corresponds to said focal plane, whose X-axis corresponds to said curved direction of said photo filmstrip, and whose Y-axis crosses the X-axis at said center point of said frame, and A to D represent correction coefficients stored as said correction parameters in said memory device.

* * * * *